(12) United States Patent
Murata (10) Patent No.: US 11,060,629 B2
(45) Date of Patent: Jul. 13, 2021

(54) SOLENOID VALVE

(71) Applicant: Nidec Tosok Corporation, Zama (JP)

(72) Inventor: Daisuke Murata, Zama (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 7 days.

(21) Appl. No.: 16/478,494

(22) PCT Filed: Feb. 2, 2018

(86) PCT No.: PCT/JP2018/003552
§ 371 (c)(1),
(2) Date: Jul. 17, 2019

(87) PCT Pub. No.: WO2018/147175
PCT Pub. Date: Aug. 16, 2018

(65) Prior Publication Data
US 2020/0041025 A1    Feb. 6, 2020

(30) Foreign Application Priority Data

Feb. 9, 2017   (JP) .............................. JP2017-022167

(51) Int. Cl.
*F16K 31/06*    (2006.01)

(52) U.S. Cl.
CPC ................................ *F16K 31/0675* (2013.01)

(58) Field of Classification Search
CPC ............ F16K 31/0675; F16K 31/0634; H01F 2007/085; H01F 2007/083; H01F 7/1615; H01F 7/081
See application file for complete search history.

(56) References Cited

U.S. PATENT DOCUMENTS

| | | | |
|---|---|---|---|
| 5,127,625 A * | 7/1992 | Kleinhappl | F16K 31/0655 251/129.17 |
| 6,450,478 B2 | 9/2002 | Parsons et al. | |
| 6,948,697 B2 * | 9/2005 | Herbert | F16K 31/0672 251/129.04 |

(Continued)

FOREIGN PATENT DOCUMENTS

| | | |
|---|---|---|
| JP | 11-37333 A | 2/1999 |
| JP | 11-311363 A | 11/1999 |

(Continued)

OTHER PUBLICATIONS

Official Communication issued in International Patent Application No. PCT/JP2018/003552, dated May 1, 2018.

*Primary Examiner* — Eric Keasel (74) *Attorney, Agent, or Firm* — Keating & Bennett (57) ABSTRACT

A solenoid valve includes a solenoid including a guide, a mover that moves in an axial direction radially inside the guide, a yoke made of a magnetic material and disposed on one axial side of the mover, a magnet on one axial side of the yoke, an elastic body that applies an elastic force to the mover in the direction away from the magnet, a cover made of a magnetic material, a pin which moves as the mover moves, and a valve that is opened and closed as the mover and the pin move. The cover includes a cylinder surrounding the radial outside of the solenoid, a first wall on the other axial side of the solenoid, and a second wall that covers one axial side of the magnet.

10 Claims, 4 Drawing Sheets

(56) References Cited

U.S. PATENT DOCUMENTS

9,523,438 B2 * 12/2016 Bamber .................. F16K 11/04

FOREIGN PATENT DOCUMENTS

| | | |
|---|---|---|
| JP | 2000-049011 A | 2/2000 |
| JP | 2010-129680 A | 6/2010 |
| JP | 2011-238937 A | 11/2011 |
| JP | 2016-051708 A | 4/2016 |

* cited by examiner

SOLENOID VALVE

CROSS REFERENCE TO RELATED APPLICATIONS

This is the U.S. national stage of PCT Application No. PCT/JP2018/003552, filed on Feb. 2, 2018, and priority under 35 U.S.C. § 119(a) and 35 U.S.C. § 365(b) is claimed from Japanese Application No. 2017-022167, filed Feb. 9, 2017; the entire disclosures of each application are incorporated herein by reference.

FIELD OF THE INVENTION

The present disclosure relates to a solenoid valve.

BACKGROUND

A solenoid valve in which a movable iron core is moved using a magnetic field of a magnet and a magnetic field generated by a solenoid is known. For example, in Japanese Unexamined Patent Application Publication No. H11-311363, a fixed iron core as a yoke of a magnet is provided between the magnet and a movable iron core in an axial direction thereof.

In the solenoid valve as described above, a magnetic circuit passing through the fixed iron core is formed by supplying a current to the solenoid. Here, since a magnetic flux generated by supplying a current to the solenoid does not easily pass through the magnet, it is necessary to increase the current supplied to the solenoid in order to move the movable iron core by forming the magnetic circuit with the solenoid. Therefore, there is a problem that the power consumption of the solenoid valve increases.

SUMMARY

Example embodiments of the present disclosure provide solenoid valves in each of which power consumption is able to be reduced.

One example embodiment of a solenoid valve of the present disclosure includes a solenoid including a cylindrical guide centered on a central axis extending in an axial direction thereof, a mover which including a magnetic body and moves in the axial direction radially inside the guide, a yoke which is made of a magnetic material and is disposed on one axial side of the mover, a magnet on one axial side of the yoke, an elastic member which applies an elastic force to the mover in a direction away from the magnet, a cover, a pin, and a valve. The cover is made of a magnetic material, includes a hole that opens toward a radial inside of the guide, and accommodates the solenoid, the mover, the yoke, the magnet, and the elastic member. The pin is positioned in the hole and moves as the mover moves. The valve is provided outside the cover and is opened and closed as the mover and the pin move. The cover includes a cylinder surrounding a radial outside of the solenoid, a first wall disposed on the other axial side of the solenoid, and a second wall that covers one axial side of the magnet. The solenoid includes a cylindrical bobbin which surrounds a radial outside of the mover and is provided with the guide section on a radially inner surface thereof, and a coil wound around on a radially outer surface of the bobbin. The yoke includes a portion located on a radial outside of the magnet at a position away from an inner surface of the cover.

According to example embodiments of the present disclosure, solenoid valves capable of reducing power consumption is provided.

The above and other elements, features, steps, characteristics and advantages of the present disclosure will become more apparent from the following detailed description of the example embodiments with reference to the attached drawings.

DETAILED DESCRIPTION

First Example Embodiment

Figure 1:
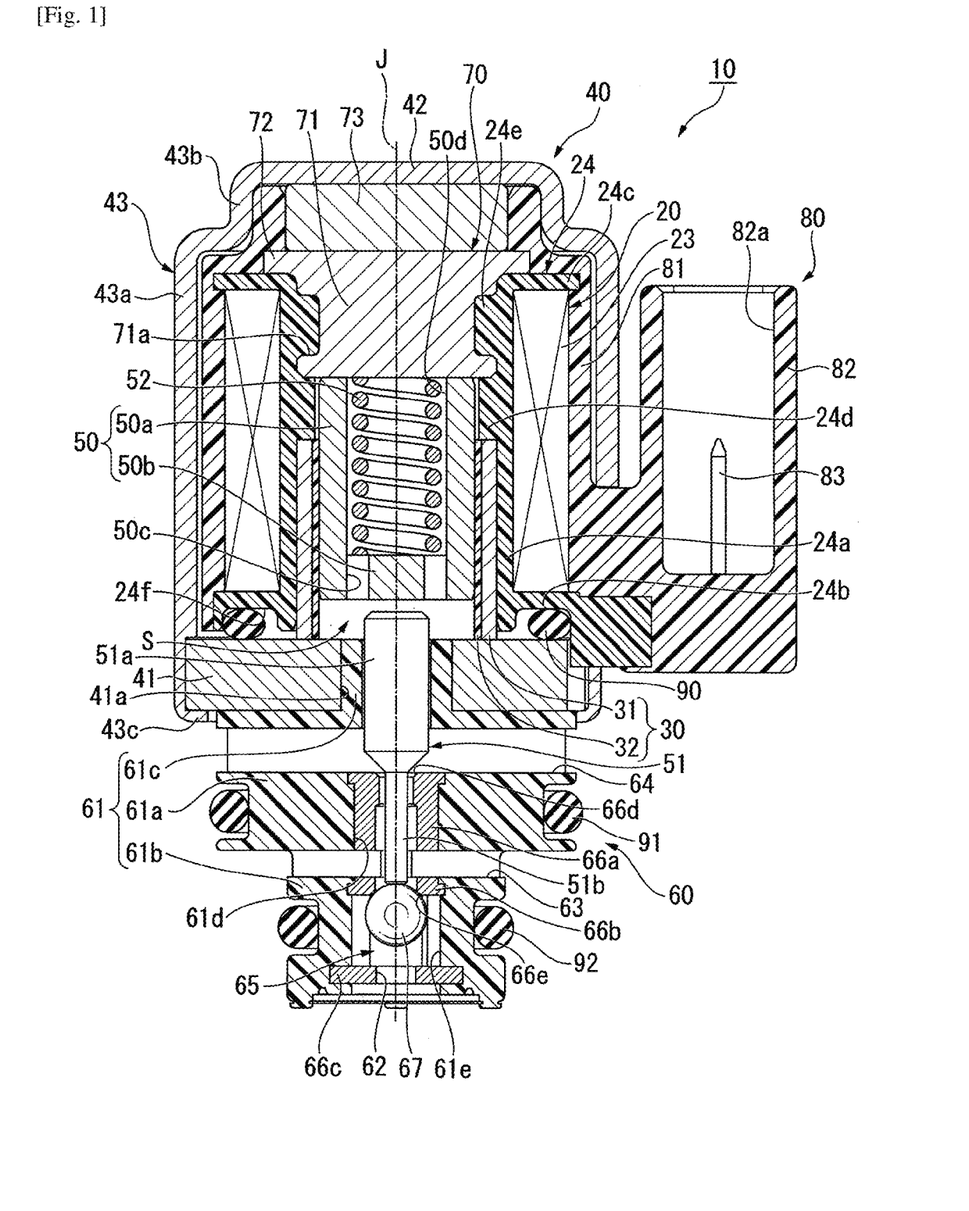
FIG. 1 is a cross-sectional view showing a solenoid valve of a first example embodiment of the present disclosure.
Figure 2:
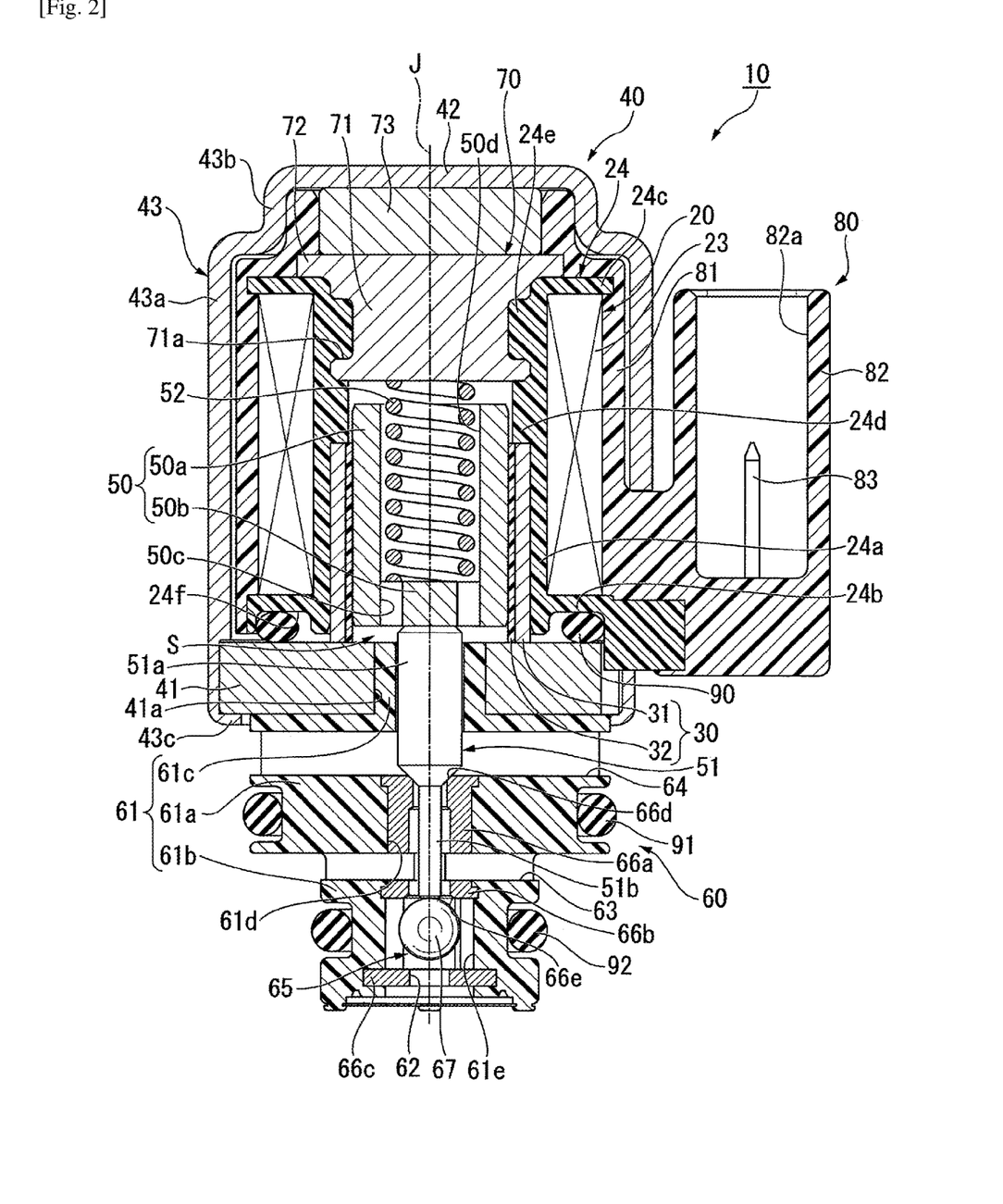
FIG. 2 is a cross-sectional view showing the solenoid valve of the first example embodiment of the present disclosure.

As shown in FIGS. 1 and 2, a solenoid valve 10 of the present example embodiment includes a cover 40, a solenoid 20 having a cylindrical guide section 30 centered on a central axis J extending in the axial direction, a yoke member 70, a magnet 73, a mover 50, an elastic member 52, and a valve section 60, a pin 51, and mold 80. By supplying current to the solenoid 20, a thrust due to a magnetic force is applied to the mover 50 so that the mover 50 moves. The pin 51 moves as the mover 50 moves. The valve section 60 is opened and closed as the mover 50 and the pin 51 move.

The central axis J extends, for example, in a vertical direction in FIG. 1. In the following description, an axial direction of the central axis J is simply referred to as an "axial direction," an upper side of FIG. 1 in the axial direction is simply referred to as an "upper side," and a lower side of FIG. 1 in the axial direction is simply referred to as a "lower side." Also, a radial direction centered on the central axis J is simply referred to as a "radial direction," and a circumferential direction centered on the central axis J is simply referred to as a "circumferential direction." In addition, the upper side and the lower side are simply names for explaining a relative positional relationship between respective parts, and the actual dispositional relationship and the like may be a dispositional relationship and the like other than the dispositional relationship and the like indicated by these names. Further, the upper side corresponds to one axial side, and the lower side corresponds to the other axial side.

The cover 40 accommodates the solenoid 20, the mover 50, the yoke member 70, the magnet 73, and the elastic member 52. The cover 40 is made of a magnetic material. The cover 40 has a cylinder section 43, a first wall section 41, and a second wall section 42. The cylinder section 43 has a tubular shape which surrounds the radial outside of the solenoid 20. In the present example embodiment, the cylinder section 43 has, for example, a cylindrical shape centered on the central axis J. The cylinder section 43 has a cylinder section main body 43a and a small diameter section 43b.

The cylinder section main body 43a is disposed radially outside the solenoid 20. An upper end of the cylinder section main body 43a overlaps the magnet 73 in the radial direction. A lower end of the cylinder section main body 43a is a lower end of the cylinder section 43. A support section 43c protruding radially inward is provided at the lower end of the cylinder section main body 43a. The support section 43c has an annular plate shape which is orthogonal to the axial direction and whose center is the central axis J. The small diameter section 43b is connected to the upper end of the cylinder section main body 43a on the upper side of the cylinder section main body 43a. An inner diameter of the small diameter section 43b is smaller than an inner diameter of the cylinder section main body 43a. An outer diameter of the small diameter section 43b is smaller than an outer diameter of the cylinder section main body 43a.

The first wall section 41 has a flat and substantially cylindrical shape. In the present example embodiment, the first wall section 41 is centered on the central axis J. The first wall section 41 is disposed below the solenoid 20. The first wall section 41 is a separate member from the cylinder section 43, and is mounted on the cylinder section 43. A radial outer edge of the first wall section 41 is fitted into a recess which is provided on an inner circumferential surface of the lower end of the cylinder section main body 43a to be recessed outward in the radial direction, and is supported by the support section 43c from the lower side. An outer circumferential surface of the first wall section 41 comes into contact with an inner circumferential surface of the cylinder section main body 43a. A lower surface of the radial outer edge of the first wall section 41 comes into contact with an upper surface of the support section 43c.

The first wall section 41 has a hole 41a which penetrates the first wall section 41 in the axial direction. That is, the cover 40 has the hole 41a. A shape of the hole 41a viewed in the axial direction is a circle centered on the central axis J. The hole 41a opens to the radial inside of the guide section 30. More specifically, an upper end opening of the hole 41a opens to the radial inside of the guide section 30. Also, the first wall section 41 may be a single member with the cylinder section 43.

The second wall section 42 has a plate shape expanding in the radial direction. In the present example embodiment, the second wall section 42 has an annular disc shape centered on the central axis J. The second wall section 42 is disposed above the solenoid 20. The second wall section 42 covers the upper side of the magnet 73. In the present example embodiment, the second wall section 42 is a single member with the cylinder section 43. A radially outer circumferential edge of the second wall section 42 is connected to an upper end of the cylinder section 43, that is, an upper end of the small diameter section 43b. The second wall section 42 may be a separate member from the cylinder section 43.

The solenoid 20 is disposed radially inside the cylinder section 43. The solenoid 20 has a bobbin section 24, a coil 23 and the guide section 30. The bobbin section 24 surrounds the radial outside of the mover 50, and has a tubular shape in which the guide section 30 is provided on a radially inner surface thereof. In the present example embodiment, the bobbin section 24 has a cylindrical shape centered on the central axis J. The bobbin section 24 is made of a resin and is a single member. The bobbin section 24 has a bobbin main body 24a, a lower flange 24b, an upper flange 24c, a first spacer 24d, and a protrusion 24e. That is, the solenoid valve 10 includes the first spacer 24d.

The bobbin main body 24a has a cylindrical shape which is centered on the central axis J and opens on both axial sides. The lower flange 24b has an annular shape expanding radially outward from a lower end of the bobbin main body 24a. A groove 24f recessed upward is provided in a lower surface of the lower flange 24b. The groove 24f has an annular shape extending over the entire circumference thereof in the circumferential direction. An annular O-ring 90 is disposed in the groove 24f. The O-ring 90 seals between the bobbin section 24 and the first wall section 41. The upper flange 24c has an annular shape expanding radially outward from an upper end of the bobbin main body 24a.

The first spacer 24d protrudes radially inward from an inner circumferential surface of the bobbin main body 24a. More specifically, the first spacer 24d protrudes radially inward from a portion of the inner circumferential surface of the bobbin main body 24a on the side above an axial center thereof. The first spacer 24d has a cylindrical shape centered on the central axis J.

The first spacer 24d is disposed between the yoke member 70 and a first guide section 31, which will be described later, of the guide section 30 in the axial direction. An upper end of the first spacer 24d comes into contact with a lower surface of the yoke member 70. A lower end of the first spacer 24d comes into contact with an upper end of the first guide section 31. An inner circumferential surface of the first spacer 24d is disposed radially outside an outer circumferential surface of the mover 50. As described above, in the present example embodiment, since the bobbin section 24 is a single member made of a resin, the first spacer 24d is also made of a resin. That is, the first spacer 24d is made of a nonmagnetic material.

The protrusion 24e protrudes radially inward from a portion of the inner circumferential surface of the bobbin main body 24a above the first spacer 24d. That is, the protrusion 24e is provided on the radially inner surface of the bobbin section 24. The first spacer 24d has a cylindrical shape centered on the central axis J. The protrusion 24e is fitted to a recess 71a, which will be described later, of the yoke member 70. An inner circumferential surface of the protrusion 24e is positioned radially inside the inner circumferential surface of the first spacer 24d.

The coil 23 is wound around a radially outer surface of the bobbin section 24, that is, an outer circumferential surface of the bobbin main body 24a. When current is applied to the coil 23, a magnetic field along the axial direction is generated inside the coil 23.

The guide section 30 has a first guide section 31 and a second guide section 32. The first guide section 31 has a tubular shape extending in the axial direction. More specifically, the first guide section 31 has a cylindrical shape centered on the central axis J. An outer circumferential surface of the first guide section 31 is fixed to the inner circumferential surface of the bobbin main body 24a. The upper end of the first guide section 31 comes into contact with the lower end of the first spacer 24d. A lower end of the first guide section 31 is positioned below the lower end of the bobbin main body 24a. The lower end of the first guide section 31 comes into contact with an upper surface of the first wall section 41. An inner circumferential surface of the first guide section 31 is positioned radially outside the inner circumferential surface of the first spacer 24d. The first guide section 31 is made of a magnetic material.

The second guide section 32 has a cylindrical shape which is centered on the central axis J and extends in the axial direction. An outer circumferential surface of the second guide section 32 is fixed to the inner circumferential surface of the first guide section 31. An upper end of the second guide section 32 is at the same position as the upper end of the first guide section 31 in the axial direction. A lower end of the second guide section 32 is at the same position as the lower end of the first guide section 31 in the axial direction, and is in contact with the upper surface of the first wall section 41. An inner circumferential surface of the second guide section 32, that is, an inner circumferential surface of the guide section 30, is positioned radially inside the inner circumferential surface of the first spacer 24d. The second guide section 32 is made of a nonmagnetic material. The second guide section 32 is made of, for example, a resin.

The yoke member 70 is provided at an upper end of the solenoid 20 and is disposed above the mover 50. The yoke member 70 is made of a magnetic material. The yoke member 70 has a yoke member main body 71 and a flange 72. The yoke member main body 71 has a cylindrical shape which is centered on the central axis J and extends in the axial direction. A lower section of the yoke member main body 71 is disposed radially inside the bobbin section 24. The lower section of the yoke member main body 71 is fitted into the bobbin main body 24a. Thus, the yoke member 70 closes an upper end opening of the bobbin section 24.

By closing the upper end opening of the bobbin section 24 using the yoke member 70, a space S surrounded by the lower surface of the yoke member 70, a radially inner surface of the solenoid 20 and the upper surface of the first wall section 41 is provided in the solenoid 20. The radially inner surface of the solenoid 20 surrounding the space S includes the inner circumferential surface of the guide section 30 and the inner circumferential surface of the first spacer 24d. An upper end of the yoke member main body 71 is positioned above the bobbin section 24.

The yoke member main body 71 has the recess 71a recessed radially inward. The recess 71a has an annular shape extending over the entire circumference of an outer circumferential surface of the yoke member main body 71 in the circumferential direction. As described above, the protrusion 24e is fitted into the recess 71a. As a result, the yoke member 70 is fixed to the bobbin section 24 so that separation of the yoke member 70 and the bobbin section 24 can be inhibited.

The bobbin section 24 is formed integrally with the yoke member 70, for example, by insert molding in which a resin is poured into a mold into which the yoke member 70 is inserted. In this case, the protrusion 24e fitted into the recess 71a is formed by flowing the resin poured into the mold into the recess 71a. That is, since the recess 71a is provided in the yoke member 70, the protrusion 24e fitted into the recess 71a is formed when the bobbin section 24 is formed by insert molding, so that detachment of the yoke member 70 from the bobbin section 24 can be inhibited. As described above, according to the present example embodiment, the bobbin section 24 can be easily formed integrally with the yoke member 70 using insert molding. Therefore, effort for assembling the yoke member 70 and the bobbin section 24 can be saved, and the assembly of the solenoid valve 10 can be performed easily.

In addition, sealing properties between the yoke member and the bobbin section 24 can be improved by fitting the protrusion 24e to the recess 71a. For this reason, a fluid which has flowed into the space S through a radial gap between a connection section 61c and the pin 51, which will be described later, can be inhibited from passing through between the yoke member 70 and the bobbin section 24, so that it is possible to inhibit the fluid from reaching the magnet 73. Thus, for example, metal pieces or the like contained in the fluid can be inhibited from adhering to the magnet 73.

The flange 72 protrudes radially outward from a portion of the yoke member main body 71 above the bobbin section 24. In the present example embodiment, the flange 72 protrudes radially outward from the upper end of the yoke member main body 71. The flange 72 is disposed at a radial position overlapping an upper end of the inner circumferential surface of the cylinder section main body 43a. The flange 72 has an annular plate shape which is orthogonal to the axial direction and is centered on the central axis J. A lower surface of the flange 72 is in contact with an upper surface of the bobbin section 24, that is, an upper surface of the upper flange 24c.

A radially outer end of the flange 72 is disposed radially outside the radially inner surface of the bobbin section 24, that is, the inner circumferential surface of the bobbin main body 24a, and radially outside the magnet 73, at a position away from the inner surface of the cover 40. That is, in the present example embodiment, the radially outer end of the flange 72 corresponds to a portion positioned radially outside the magnet 73 at a position away from the inner surface of the cover 40. The radially outer end of the flange 72 is disposed radially outside the radially outer surface of the bobbin section 24, that is, the outer circumferential surface of the bobbin main body 24a. A connection section between the cylinder section main body 43a and the small diameter section 43b is positioned on a side outward from and obliquely above the radially outer end of the flange 72.

The magnet 73 has a flat cylindrical shape centered on the central axis J. The magnet 73 is disposed above the yoke member 70. A lower surface of the magnet 73 comes in contact with an upper surface of the yoke member 70. An upper surface of the magnet 73 comes into contact with a lower surface of the second wall section 42. The magnet 73 is disposed radially inwardly away from an inner circumferential surface of the small diameter section 43b. An outer circumferential surface of the magnet 73 is positioned radially inside the outer circumferential surface of the bobbin main body 24a. The magnet 73 has an N pole and an S pole magnetic poles disposed in the axial direction. In the present example embodiment, for example, between the magnetic poles of the magnet 73, one magnetic pole disposed on the upper side is the N pole, and the other magnetic pole disposed on the lower side is the S pole.

The mover 50 is accommodated in the space S and is disposed radially inside the guide section 30. In the present example embodiment, the mover 50 has, for example, a cylindrical shape with a bottom which is centered on the central axis J and opens upward. The mover 50 is fitted into a radial inside of the guide section 30 and is supported by the guide section 30 to be movable in the axial direction. As a result, the mover 50 moves in the axial direction in the radial inside of the guide section 30. An upper end of the mover 50 is positioned above the guide section 30. The mover 50 has a magnetic body section. In the present example embodiment, the mover 50 is a single member made of a magnetic material. That is, in the present example embodiment, the entire mover 50 corresponds to the magnetic body section.

The mover 50 has a cylinder 50a with a cylindrical shape extending in the axial direction, and a bottom wall 50b provided at a lower end of the cylinder 50a. A through hole 50c penetrating the bottom wall 50b in the axial direction is provided in the bottom wall 50b. For example, a plurality of through holes 50c are provided. The mover 50 has an accommodating recess 50d recessed downward from the upper end. In the present example embodiment, the accommodating recess 50d is configured by an inner surface of the cylindrical mover 50.

In the present example embodiment, the elastic member 52 is a coil spring extending in the axial direction. The elastic member 52 is accommodated in the accommodating recess 50d. An upper end of the elastic member 52 comes into contact with the lower end of the yoke member 70. A lower end of the elastic member 52 comes into contact with a bottom surface of the accommodating recess 50d, that is, the top surface of the bottom wall 50b. The elastic member 52 applies an elastic force to the mover 50 in the direction away from the magnet 73, that is, in the present example embodiment, in a downward direction. Thus, since the elastic member 52 can be disposed inside the mover 50, increase in size of the solenoid valve 10 in the axial direction can be inhibited.

The valve section 60 is provided outside the cover 40. The valve section 60 is attached to a lower side of the cover 40. The valve section 60 has a nozzle member 61, a first valve seat member 66a, a second valve seat member 66b, a lid member 66c, and a valve body 67.

The nozzle member 61 has a substantially cylindrical shape centered on the central axis J. The nozzle member 61 is made of a resin and is a single member. The nozzle member 61 has a first section 61a, a second section 61b, and a connection section 61c. The first section 61a is fixed to the first wall section 41. An upper surface of the first section 61a comes into contact with the lower surface of the first wall section 41. The first section 61a has a drain port 64 penetrating the first section 61a in the radial direction. An O-ring 91 is mounted on an outer circumferential surface of a portion below the drain port 64 in the first section 61a.

The second section 61b is connected to the lower end of the first section 61a below the first section 61a. An outer diameter of the second section 61b is smaller than an outer diameter of the first section 61a. The second section 61b has an out-port 63 penetrating the second section 61b in the radial direction. The out-port 63 is provided at an upper end of the second section 61b and is positioned between the first section 61a and the second section 61b in the axial direction. An O-ring 92 is mounted on an outer circumferential surface of the second section 61b.

A through hole 61d penetrating from the drain port 64 to the out-port 63 is provided in the first section 61a. A through hole 61e penetrating from a lower end of the second section 61b to the out-port 63 is provided in the second section 61b. Cross-sectional shapes of the through holes 61d and 61e are, for example, a circular shape centered on the central axis J.

The connection section 61c protrudes upward from the upper surface of the first section 61a. The connection section 61c has a cylindrical shape centered on the central axis J. The connection section 61c is fitted into and fixed to the hole 41a. An upper end of the connection section 61c is disposed at the same position in the axial direction as the upper surface of the first wall section 41. The connection section 61c opens on both axial sides. An upper opening of the connection section 61c opens to the radial inside of the guide section 30 in the space S. A lower opening of the connection section 61c opens to the drain port 64.

The first valve seat member 66a has a cylindrical shape which is centered on the central axis J and opens on both axial sides. The first valve seat member 66a is fitted into and fixed to the through hole 61d. A first valve seat 66d is provided at an inner circumferential edge of an upper end of the first valve seat member 66a. The second valve seat member 66b has an annular plate shape which is orthogonal to the axial direction and is centered on the central axis J. The second valve seat member 66b is fitted into and fixed to an upper end of the through hole 61e. A second valve seat 66e is provided at an inner circumferential edge of a lower end of the second valve seat member 66b. The lid member 66c has a disk shape centered on the central axis J. The lid member 66c has a radially outer edge which is embedded in and fixed to an inner circumferential surface of the lower end of the through hole 61e. The lid member 66c has an in-port 62 penetrating the lid member 66c in the axial direction.

A valve chamber 65 surrounded by an inner circumferential surface of the through hole 61e, a lower surface of the second valve seat member 66b, and an upper surface of the lid member 66c is formed. The valve body 67 is movably disposed in the valve chamber 65. The valve body 67 is, for example, a sphere. An outer diameter of the valve body 67 is larger than an inner diameter of the in-port 62 and an inner diameter of the second valve seat member 66b.

The pin 51 is positioned in the hole 41a. More specifically, the pin 51 is axially movably supported radially inside the connection section 61c fitted in the hole 41a. The pin 51 has, for example, a cylindrical shape extending in the axial direction. The pin 51 has a supported section 51a inserted into the radial inside of the connection section 61c, and an operating section 51b extending downward from a lower end of the supported section 51a. An upper end of the supported section 51a protrudes into the space S and is located radially inside the guide section 30. An upper end surface of the supported section 51a can contact the lower end surface of the mover 50. A lower end of the supported section 51a is located in the drain port 64. The lower end of the supported section 51a is tapered such that its outer diameter decreases from the upper side toward the lower side.

An outer diameter of the operating section 51b is smaller than the outer diameter of the supported section 51a. The operating section 51b extends through the inside of the first valve seat member 66a and the out-port 63 to the inside of the second valve seat member 66b. A lower end of the operating section 51b can come into contact with the valve body 67.

The mold 80 has a mold main body 81 and a connector 82. The mold main body 81 is positioned inside the cover 40. The mold main body 81 covers a radially outer side of the solenoid 20, a radially outer side of the flange 72, and a radially outer side of the magnet 73. An upper end of the mold main body 81 is fitted into the radial inside of the small diameter section 43b. A gap is provided between a radially outer surface of the mold main body 81 and the inner circumferential surface of the cylinder section 43 in the radial direction.

The connector 82 extends upward from a position protruding radially outward from the mold main body 81. The connector 82 is exposed to the outside of the cover 40. The connector 82 has a connector opening 82a that opens upward. The connector 82 has a connection terminal 83. One end of the connection terminal 83 protrudes upward from a bottom surface of the connector opening 82a. Although illustration thereof will be omitted, the other end of the connection terminal 83 is electrically connected to the coil 23. The connector 82 is connected to an external power supply (not shown). The external power supply supplies current to the coil 23 through the connection terminal 83.

Figure 3:
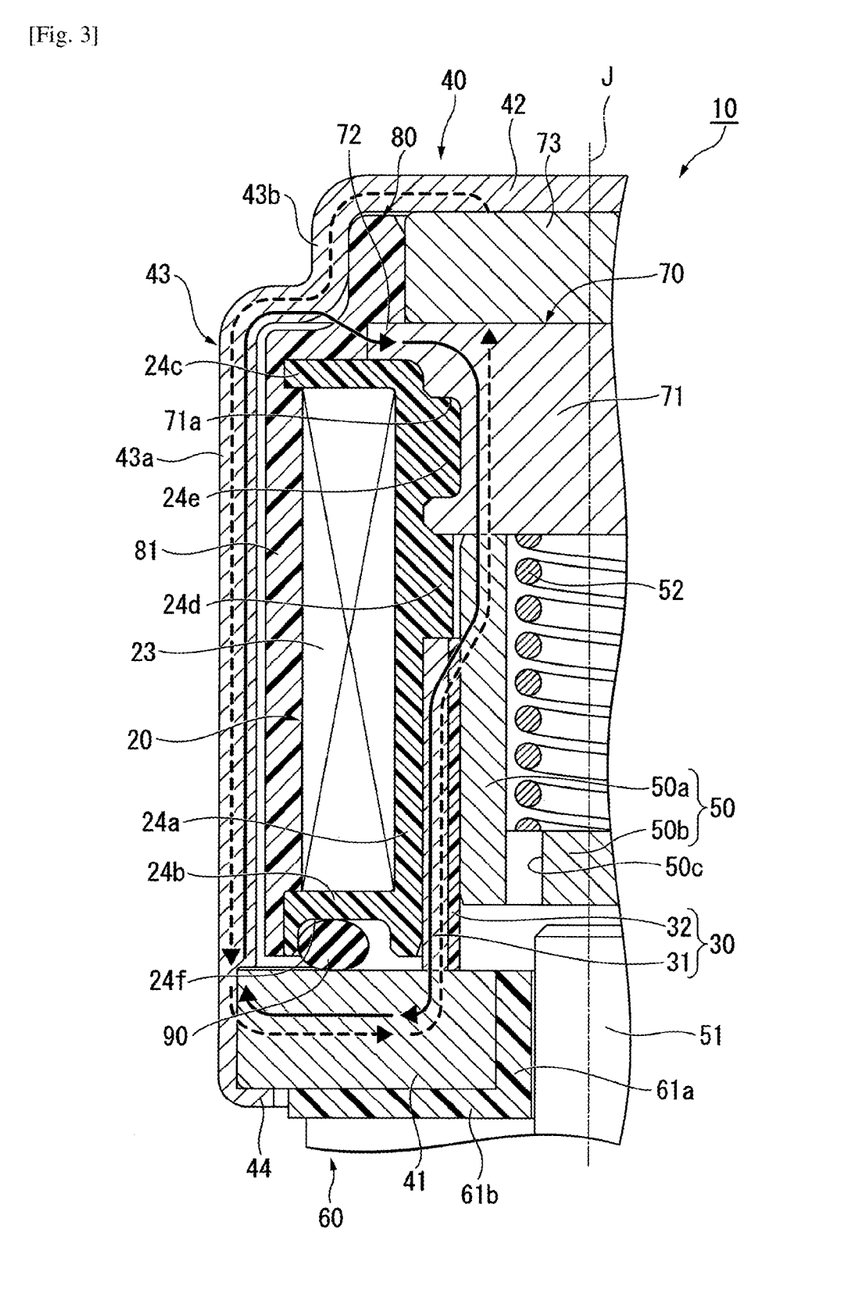
FIG. 3 is a cross-sectional view showing a portion of the solenoid valve of the first example embodiment of the present disclosure.

As indicated by a broken arrow in FIG. 3, magnetic flux of the magnet 73 is released from the top surface of the magnet 73 into the second wall section 42. The magnetic flux discharged into the second wall section 42 returns from the lower surface to the magnet 73 through the cylinder section 43, the first wall section 41, the first guide section 31, the mover 50, and the yoke member 70 in this order. Thus, a magnetic circuit is formed, and the first wall section 41, the yoke member 70, and the mover 50 formed of a magnetic body are excited. Between the excited yoke member 70 and the mover 50, mutually attracting magnetic forces are generated. Further, a magnetic force attracting each other is generated between the excited first wall section 41 and the mover 50.

FIGS. 1 and 3 show a state in which the mover 50 is attracted to the yoke member 70 due to the magnetic force with the yoke member 70. Here, in a state where the mover 50 is attracted to the yoke member 70, the attractive magnetic force acting between the mover 50 and the yoke member 70 is larger than the force obtained by combining the attractive magnetic force acting between the first wall section 41 and the mover 50 and the downward elastic force applied to the mover 50 due to the elastic member 52. Therefore, the mover 50 can be held in a state of being attracted to the yoke member 70 without supplying current to the solenoid 20.

As shown in FIG. 1, in the state where the mover 50 is attracted to the yoke member 70, the valve body 67 is pushed upward by the pressure of the fluid flowing in from the in-port 62 and is fitted to the second valve seat 66e. Thus, the valve body 67 blocks between the in-port 62 and the out-port 63. Therefore, the valve section 60 is in the closed state. When the valve section 60 is closed, the out-port 63 communicates with the drain port 64 through the inside of the first valve seat member 66a.

On the other hand, FIG. 2 shows the mover 50 separated from the yoke member 70 due to the magnetic force with the first wall section 41 and the downward elastic force applied by the elastic member 52. In this state, the attractive magnetic force acting between the mover 50 and the yoke member 70 is smaller than the force obtained by combining the attractive magnetic force acting between the first wall section 41 and the mover 50 and the downward elastic force applied to the mover 50 by the elastic member 52. Therefore, the mover 50 can be held in the state of FIG. 2 apart from the yoke member 70 without supplying current to the solenoid 20.

In the state shown in FIG. 2, the pin 51 is pushed downward by the mover 50 attracted to the first wall section 41. For this reason, the valve body 67 is pushed down and removed from the second valve seat 66e, and the in-port 62 and the out-port 63 are connected. As a result, the valve section 60 is in an open state, and the fluid flowing from the in-port 62 into the valve chamber 65 flows to the out-port 63. In the state where the valve section 60 is open, the tapered section which is the lower end of the supported section 51a is fitted into the first valve seat 66d. Thus, the pin 51 blocks between the drain port 64 and the out-port 63. Therefore, it is possible to inhibit the pressure of the fluid flowing from the in-port 62 into the out-port 63 from being released. In the state where the valve section 60 is open, a gap is provided between the mover 50 and the first wall section 41 in the axial direction.

As described above, according to the present example embodiment, since there is no need to supply current to the solenoid 20 in order to maintain the open state of the valve section 60 and the closed state of the valve section 60, power consumption of the solenoid valve 10 can be reduced.

In the solenoid valve 10, the mover 50 can be moved in the axial direction by supplying current to the solenoid 20 and supplying current to the coil 23. It is possible to switch between the state in which the valve section 60 is open and the state in which the valve section 60 is closed. For example, with the valve section 60 shown in FIG. 1 closed, when the current is supplied to the solenoid 20 so that the direction of the current flowing through the coil 23 is clockwise as viewed from above, a magnetic circuit shown by a solid arrow in FIG. 3 is generated. That is, the magnetic flux generated by the solenoid 20 travels downward from the yoke member main body 71 to the first wall section 41 through the mover 50 and the first guide section 31, and then flows from the first wall section 41 to the cylinder section 43 on the radial outer side, and goes upward in the cylinder section 43. Then, the magnetic flux generated by the solenoid 20 moves from a connecting section between the cylinder section main body 43a and the small diameter section 43b to the flange 72 and returns to the yoke member main body 71.

The direction of the magnetic flux passing through the yoke member 70, the mover 50 and the first wall section 41 in the magnetic circuit generated by the solenoid 20 is opposite to the direction of the magnetic flux passing through the yoke member 70, the mover 50 and the first wall section 41 in the magnetic circuit generated by the magnet 73. For this reason, in the yoke member 70, the mover 50, and the first wall section 41, the magnetic flux from the magnetic circuit of the solenoid 20 and the magnetic flux from the magnetic circuit of the magnet 73 weaken each other. Thus, the attractive magnetic force acting between the yoke member 70 and the mover 50 is reduced. Therefore, the attractive magnetic force acting between the mover 50 and the yoke member 70 becomes smaller than the force obtained by combining the attractive magnetic force acting between the first wall section 41 and the mover 50 and the downward elastic force applied to the mover 50 by the elastic member 52, so that the mover 50 moves downward. As a result, the state of the valve section 60 can be changed from the closed state to the open state.

After the mover 50 moves downward and reaches the state shown in FIG. 2, even if the supply of current to solenoid 20 is stopped, the mover 50 is held in the state shown in FIG. 2 as described above, and the valve section 60 is kept in the open state.

On the other hand, for example, in a state where the valve section 60 shown in FIG. 2 is opened, when the direction of the current flowing through the coil 23 is counterclockwise as viewed from above, that is, when the current is supplied to the solenoid 20 in the opposite direction to that when the valve section 60 is opened, a magnetic circuit in the opposite direction to the magnetic circuit shown by the solid arrow in FIG. 3 is generated. That is, the magnetic flux generated by the solenoid 20 travels upward from the first wall section 41 to the yoke member main body 71 via the first guide section 31 and the mover 50, and then passes from the yoke member main body 71 to the flange 72 on the radial outside. Then, the magnetic flux generated by the solenoid 20 moves from the flange 72 to the connecting section of the cylinder section main body 43a and the small diameter section 43b, travels downward in the cylinder section 43, and returns to the first wall section 41.

The direction of the magnetic flux passing through the yoke member 70, the mover 50 and the first wall section 41 in the magnetic circuit generated by the solenoid 20 is the same as the direction of the magnetic flux passing through the yoke member 70, the mover 50 and the first wall section 41 in the magnetic circuit generated by the magnet 73. For this reason, in the yoke member 70, the mover 50, and the first wall section 41, the magnetic flux by the magnetic circuit of the solenoid 20 and the magnetic flux by the magnetic circuit of the magnet 73 mutually strengthen each other. Thus, the attractive magnetic force acting between the yoke member 70 and the mover 50 is increased. Therefore, the attractive magnetic force acting between the mover 50 and the yoke member 70 becomes larger than the force obtained by combining the attractive magnetic force acting between the first wall section 41 and the mover 50 and the downward elastic force applied to the mover 50 by the elastic member 52, so that the mover 50 moves upward. As a result, the state of the valve section 60 can be changed from the open state to the closed state.

After the mover 50 moves upward and reaches the state shown in FIG. 1, even if the supply of current to the solenoid 20 is stopped, the mover 50 is held in the state shown in FIG. 1 as described above, and the valve section 60 is kept closed.

According to the present example embodiment, the yoke member 70 has the flange 72 at a position away from the inner surface of the cover 40 as a portion positioned radially outside the magnet 73. For this reason, a part of the yoke member 70 can be brought close to the cover 40, and the magnetic flux can be easily passed between the yoke member 70 and the cover 40 without the magnet 73. Thus, even if the amount of current supplied to the solenoid 20 is relatively small, the magnetic circuit of the solenoid 20 which does not pass through the magnet 73 can be easily formed, and the mover 50 can be moved in the axial direction. Therefore, according to the present example embodiment, the solenoid valve 10 capable of reducing power consumption can be obtained.

In addition, for example, when the radially outer end of the flange is located at the same position as the radially outer end of the magnet 73 in the radial direction, or radially inner than the magnet 73, the magnetic flux of the solenoid 20 does not easily flow between the yoke member 70 and the cover 40, and easily flows from the yoke member 70 to the magnet 73 or from the cover 40 to the magnet 73. However, in the magnet 73, since the magnetic flux of the solenoid 20 does not easily pass, it is necessary to increase the current supplied to the solenoid 20. Therefore, a portion of the yoke member 70, that is, the flange 72, is not enough just to be close to the cover 40 simply, and needs to be located radially outside the magnet 73 as in the present example embodiment.

Also, for example, when the flange comes in contact with the cover 40, the magnetic flux of the solenoid 20 easily flows between the yoke member and the cover 40. However, on the other hand, the magnetic flux emitted from the magnet 73 to the second wall section 42 flows from a contact point between the yoke member and the cover 40 to the yoke member and easily returns to the magnet 73. For this reason, it is difficult to form a magnetic circuit as shown by a broken line in FIG. 3. As a result, the mover 50 may not be suitably given a thrust by the magnetic force. Therefore, a portion of the yoke member 70, that is, the flange 72 is not enough just to be close to the cover 40 simply, but needs to be separated from the inner side surface of the cover 40 as in the present example embodiment.

Further, according to the present example embodiment, since the guide section 30 has the first guide section 31 made of a magnetic material, magnetic flux can be easily passed between the first wall section 41 and the mover 50 through the first guide section 31. As a result, the magnetic circuit by the solenoid 20 can be more easily configured, and the power consumption of the solenoid valve 10 can be more easily reduced.

Also, for example, when the upper end of the first guide section 31 contacts the yoke member 70, the magnetic flux can easily move from the yoke member 70 to the first wall section 41 or from the first wall section 41 to the yoke member 70 through the first guide section 31. For this reason, it may be difficult for the magnetic flux to flow in the mover 50, and it may be difficult to give the mover 50 a thrust force due to the magnetic force.

On the other hand, according to the present example embodiment, the non-magnetic first spacer 24d is provided between the yoke member 70 and the first guide section 31 in the axial direction. For this reason, the magnetic flux moved from the first wall section 41 to the first guide section 31 moves to the yoke member 70 after moving to the mover 50 positioned radially inside the guide section 30. Also, the magnetic flux is likely to flow from the yoke member 70 to the mover 50. Therefore, in the magnetic circuit of the magnet 73 and the magnetic circuit of the solenoid 20, the magnetic flux can easily pass through the inside of the mover 50, and the mover 50 can easily give a thrust by the magnetic force.

Further, according to the present example embodiment, since the cylinder section 43 has the small diameter section 43b having a smaller outer diameter at the upper end, the cover 40 can be brought closer to the flange 72. Therefore, the magnetic circuit of the solenoid 20 can be formed more easily, and the power consumption of the solenoid valve 10 can be further reduced.

Further, according to the present example embodiment, the flange 72 is a portion located radially outside the magnet 73 at a position away from the inner side surface of the cover 40. For this reason, a part of the yoke member 70 can be brought close to the cover 40 while the outside diameter of the yoke member main body 71 is made relatively small and disposed radially inside the solenoid 20. As a result, it is possible to easily form the magnetic circuit of the solenoid 20 while reducing the radial size of the solenoid valve 10, and power consumption of the solenoid valve 10 can be reduced.

Further, according to the present example embodiment, since the radially outer end of the flange 72 is disposed radially outside the radially outer surface of the bobbin section 24, the flange 72 can be brought closer to the cover 40. Therefore, the magnetic circuit of the solenoid 20 can be formed more easily, and the power consumption of the solenoid valve 10 can be further reduced.

Second Example Embodiment

Figure 4:
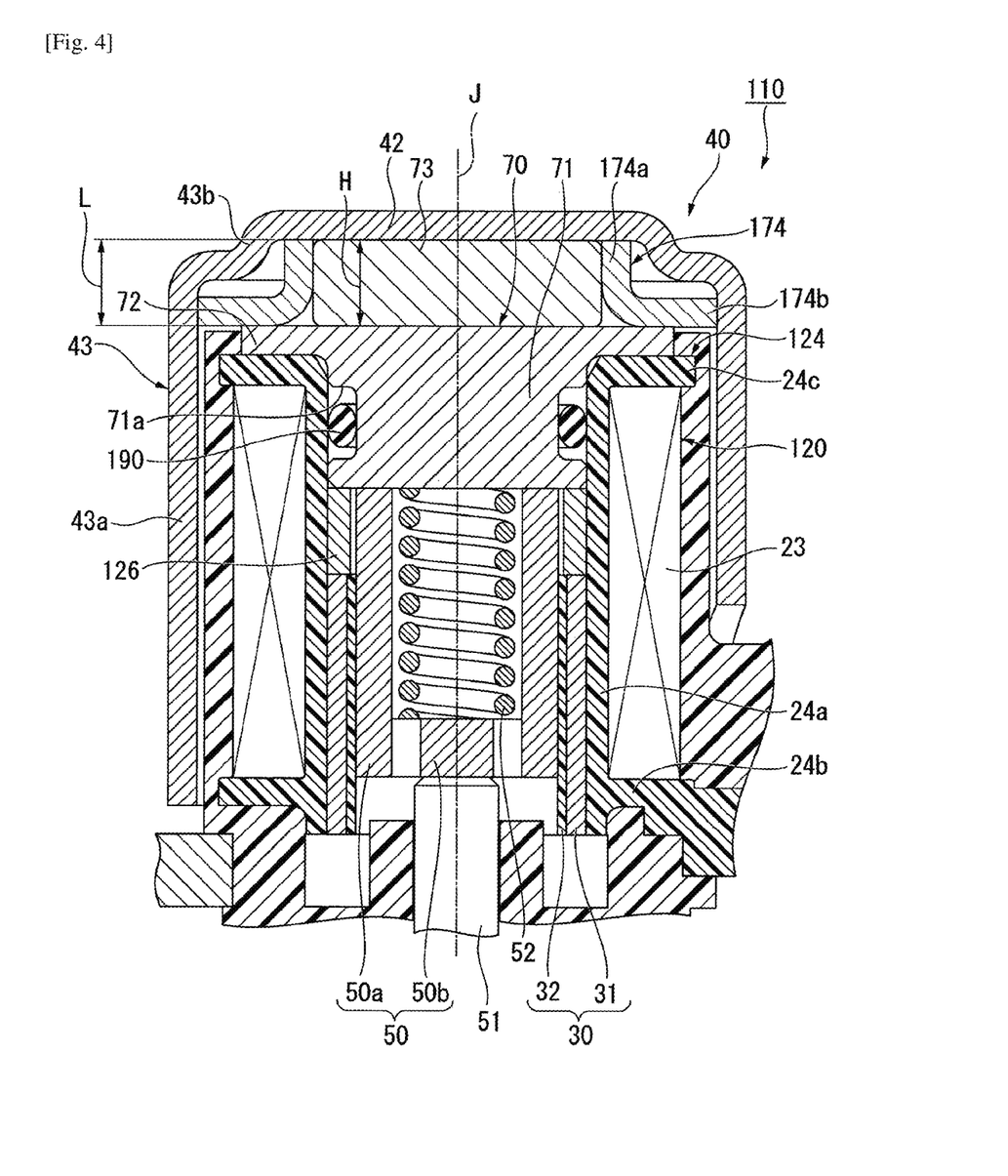
FIG. 4 is a cross-sectional view showing a portion of a solenoid valve according to a second example embodiment of the present disclosure.

As shown in FIG. 4, a solenoid valve 110 of the present example embodiment includes a second spacer 174. The second spacer 174 is an annular member centered on the central axis J. The second spacer 174 is made of a nonmagnetic material. The second spacer 174 is accommodated in the cover 40 and disposed radially outside the magnet 73.

The second spacer 174 has a cylindrical main body section 174a extending in the axial direction, and an annular plate section 174b which has an annular plate shape and expands in the radial direction from a lower end of the main body section 174a. An upper end of the main body section 174a contacts a lower surface of the second wall section 42. A magnet 73 is fitted to the radial inside of the main body section 174a. A lower surface of the annular plate section 174b comes into contact with the upper surface of the flange 72. A radially outer end of the annular plate section 174b comes into contact with the inner circumferential surface of the cylinder section main body 43a.

The axial distance L from the lower surface of the second wall section 42 to the lower end of the second spacer 174, that is, the lower surface of the annular plate section 174b, is larger than the axial dimension H of the magnet 73. For this reason, even when an upward force is applied to the solenoid 20 and the yoke member 70 when the solenoid valve 110 is assembled, direct application of force from the yoke member 70 to the magnet 73 can be inhibited by the second spacer 174. Thus, damage to the magnet 73 can be inhibited. The case where an upward force is applied to the solenoid 20 and the yoke member 70 at the time of assembly of the solenoid valve 110 is, for example, such a case where the lower end of the cover 40 is caulked to accommodate and fix each part in the cover 40, etc.

Unlike the first example embodiment, the bobbin section 124 does not have the protrusion 24e. Instead, an O-ring 190 is disposed in the recess 71a. Thus, the sealing performance between the yoke member 70 and the bobbin section 124 can be improved. For this reason, the fluid flowing into the space in which the mover 50 moves can be inhibited from passing between the yoke member 70 and the bobbin section 124, and the fluid can be inhibited from reaching the magnet 73.

Unlike the first example embodiment, the first spacer 126 is a separate member from the bobbin section 124. The first spacer 126 has a cylindrical shape centered on the central axis J. The first spacer 126 is fitted into the inner circumferential surface of the bobbin main body 24a. The first spacer 126 is made of, for example, nonmagnetic metal.

The present disclosure is not limited to the above-described example embodiments, and other configurations can be adopted. The yoke member may not have a flange. In this case, for example, the yoke member may have a columnar shape with an outer diameter substantially uniform throughout the axial direction. The configuration of the yoke member is not particularly limited as long as at least a part of the yoke member is located radially outside the magnet 73 at a position away from the inner side surface of the cover 40.

Moreover, in the above example embodiments, although the configuration in which the inner circumferential surface of the first spacer is positioned radially outside the inner circumferential surface of the guide section 30 has been described, the present disclosure is not limited thereto. The inner circumferential surface of the first spacer may be disposed at the same position as the inner circumferential surface of the guide section 30 in the radial direction. In this case, the first spacer also functions as a guide that supports the mover 50 movably in the axial direction. Further, the cover 40 may not have the small diameter section 43b. Further, the configuration of the elastic member 52 is not particularly limited as long as an elastic force is applied to the mover 50 in the direction away from the magnet 73.

Moreover, each structure described above can be combined suitably in the range of not contradicting mutually.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A solenoid valve comprising:
a solenoid including a cylindrical guide centered on a central axis extending in an axial direction thereof;
a mover including a magnetic body and movable in the axial direction radially inside the guide;
a yoke made of a magnetic material and disposed on one axial side of the mover;
a magnet on one axial side of the yoke;
an elastic member to apply an elastic force to the mover in a direction away from the magnet;
a cover made of a magnetic material and including a hole that opens toward a radial inside of the guide, the cover accommodating the solenoid, the mover, the yoke, the magnet, and the elastic member;
a pin positioned in the hole and movable with movement of the mover; and
a valve structure outside the cover and openable and closable as the mover and the pin move; wherein
the cover includes a cylinder surrounding a radial exterior of the solenoid, a first wall disposed on an axial side of the solenoid, and a second wall that covers one axial side of the magnet;
the solenoid includes a cylindrical bobbin surrounding a radial exterior of the mover and is provided with the guide on a radially inner surface thereof, and a coil wound around on a radially outer surface of the bobbin; and
the yoke includes a portion located on a radial outside of the magnet at a position away from an inner surface of the cover.

2. The solenoid valve according to claim 1, wherein
the guide includes a cylindrical first guide extending in the axial direction;
an end of the first guide on the other axial side contacts the first wall; and
the first guide is made of a magnetic material.

3. The solenoid valve according to claim 2, wherein
the bobbin includes a nonmagnetic first spacer disposed between the yoke and the first guide in the axial direction.

4. The solenoid valve according to claim 1, wherein the cylinder includes a small diameter with an outer diameter decreasing toward an end thereof on one axial side.

5. The solenoid valve according to claim 1, wherein
the yoke includes a yoke main body in which a portion on the other axial side is disposed radially inside the bobbin, and a flange protruding radially outward from a portion on one axial side of the bobbin in the yoke main body; and
a radially outer end of the flange is radially outside the radially inner side surface of the bobbin and radially outside the magnet at a position away from the inner surface of the cover.

6. The solenoid valve according to claim 5, wherein the radially outer end of the flange is radially outside the radially outer surface of the bobbin.

7. The solenoid valve according to claim 5, wherein
the bobbin includes a protrusion provided on a radially inner side surface of the bobbin, protrudes radially inward, and is made of a resin;
the yoke main body includes a recess recessed radially inward; and
the protrusion is fitted into the recess.

8. The solenoid valve according to claim 5, further comprising:
a second spacer which is accommodated in the cover and is radially outside the magnet, wherein
a distance in the axial direction from a surface on the another axial side of the second wall to an end on the another axial side of the second spacer is larger than an axial dimension of the magnet.

9. The solenoid valve according to claim 1, further comprising:
a second spacer accommodated in the cover and is disposed radially outside the magnet; wherein
a distance in the axial direction from a surface on the other axial side of the second wall to an end on the other axial side of the second spacer is larger than an axial dimension of the magnet.

10. The solenoid valve according to claim 1, wherein
the mover includes an accommodating recess which is recessed from the end on one axial side to the other axial side;
the elastic member is accommodated in the accommodating recess;
an end on one axial side of the elastic member contacts an end on another axial side of the yoke; and
an end on the another axial side of the elastic member contacts a bottom surface of the accommodating recess.

* * * * *